Oct. 2, 1934.  W. LA HODNY  1,975,159
COMBINED MIRROR AND TIME PIECE
Filed Nov. 22, 1930  2 Sheets-Sheet 1
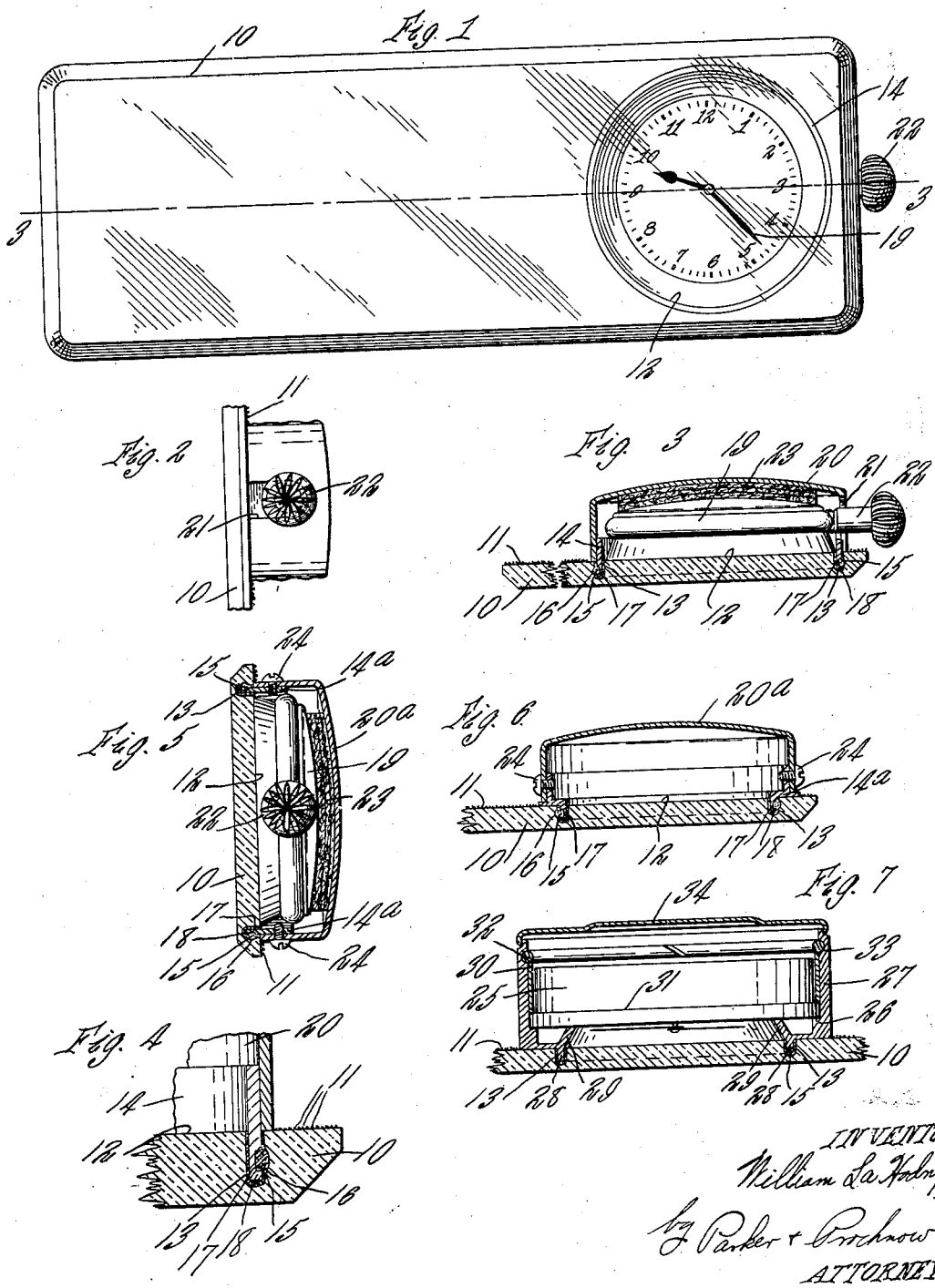
INVENTOR
William La Hodny
by Parker & Prochnow
ATTORNEYS

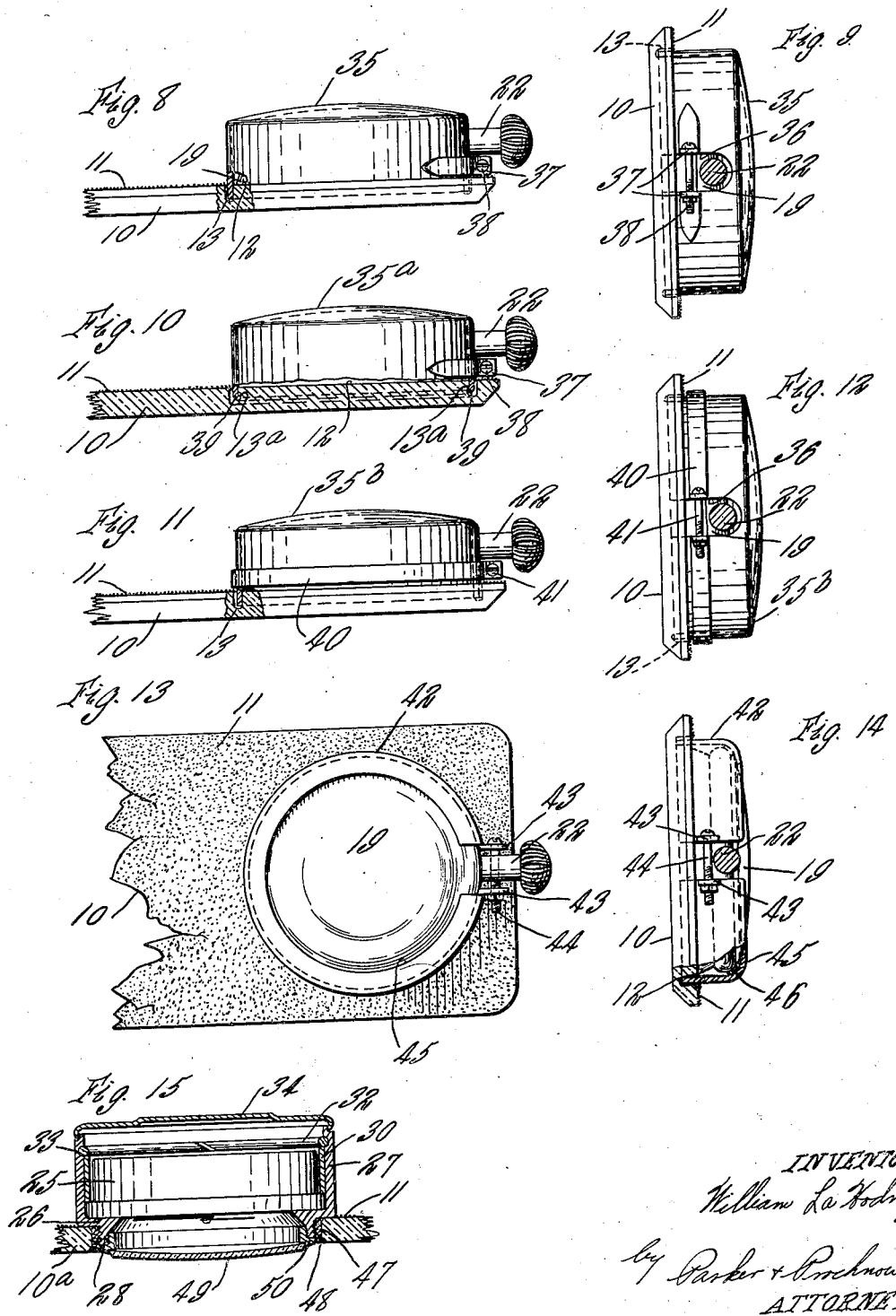

Patented Oct. 2, 1934

1,975,159

UNITED STATES PATENT OFFICE 1,975,159

COMBINED MIRROR AND TIME PIECE

William La Hodny, Buffalo, N. Y., assignor to Standard Mirror Company, Inc., Buffalo, N. Y., a corporation of New York Application November 22, 1930, Serial No. 497,434

15 Claims. (Cl. 45—97)

This invention relates to combined mirrors and time pieces, and particularly to those known as rear view mirrors and used in connection with motor vehicles.

An object of the invention is to improve and simplify articles of this type.

Another object of the invention is to provide improved means for attaching a time piece to the rear face of a mirror so as to form a unit thereof; which will not detract from the normal use and appearance of the mirror; with which the dial and hands of the time piece will be clearly visible to one looking into the mirror; with which the time piece may be removed for repairs or replacement in a simple manner; and which will be relatively simple, practical and inexpensive.

Various other objects and advantages will be apparent from the following description of several embodiments of the invention, and the novel features will be particularly pointed out hereinafter in connection with the appended claims.

In the accompanying drawings:

Fig. 1 is a front elevation of a rear view mirror having a time piece attached thereto in accordance with this invention;

Fig. 2 is an end elevation of a part of the same;

Fig. 3 is a longitudinal, sectional plan of the same, the section being taken approximately along the line 3—3 of Fig. 1;

Fig. 4 is an enlarged, sectional elevation of a part of the same, to show clearly certain details of the construction;

Fig. 5 is a transverse, sectional elevation of a mirror to which a time piece has been attached, also in accordance with this invention, but illustrating another embodiment thereof;

Fig. 6 is a sectional plan of a rear view mirror having means for attaching a time piece thereto, and illustrating another embodiment of the invention;

Fig. 7 is a sectional plan, similar to Fig. 6, and illustrating still another embodiment of the invention;

Fig. 8 is a plan of one end of a rear view mirror partly in section and illustrating another embodiment of the invention;

Fig. 9 is an end elevation of the same, partly in section;

Fig. 10 is a plan, partly in section, of a mirror, also constructed in accordance with the invention and illustrating another embodiment of the invention;

Fig. 11 is a similar plan, but illustrating another embodiment of the invention;

Fig. 12 is an end elevation, partly in section, of the same;

Fig. 13 is a rear elevation of a mirror with a time piece mounted thereon, and illustrating another embodiment of the invention;

Fig. 14 is an end elevation, partly in section, of the same; and

Fig. 15 is a sectional plan of a rear view mirror and time piece, illustrating still another embodiment of the invention.

Referring first to Figs. 1 to 4, the mirror includes a reflecting member 10, which is preferably a plate of transparent material, such as glass, provided with a reflecting coating 11 upon its rear face, as usual in rear view mirrors.

The reflecting coating 11 is either omitted from, or subsequently removed from an interior area of the rear face of the plate so as to provide a sight opening or clear area 12. An annular groove 13 is provided in the rear face of the plate, the groove being preferably aligned with and surrounding the clear area or sight opening 12. The groove extends only partially through the plate as shown in Fig. 3.

An annular ring 14 is disposed edgewise against the rear face of said plate and in said groove, the endwise length of the ring being such that the ring projects from the rear face of the plate a short distance. The ring does not entirely fill the groove, and the space in the groove around the ring is filled with a suitable cement 15, so that the ring is firmly, directly and securely anchored in the groove and forms a mechanical extension or annular flange on the rear face of the plate.

Any suitable cement may be used, but cements of the cellulose, shellac and gum types are suitable and have the advantage that they are somewhat yielding to compensate for differences in the rates of expansion and contraction of the plate and ring. The surfaces of the ring and walls of the groove, are usually sufficiently rough for the cement to adhere tightly thereto, but the groove may have an undercut portion 16, shown in an enlarged view in Fig. 5, into which the cement may flow and form a key which locks the cement mass within the groove.

Similarly the ring 14 may be provided, in one of its faces, with a groove 17, such as in the face towards the undercut section 16 of the groove, into which the cement may also flow and serve as a key which locks or anchors the ring within the groove. The groove 17 in the ring 14 may be considered as providing a shoulder or abutment 18, facing outwardly of the groove, and the cement which overlies the abutment or shoulder 18, prevents removal of the ring from the groove in the plate.

A time piece 19, such as a watch movement, is disposed at the rear of the plate with its dial plate or face abutting against the rear face of the plate in alignment with the sight opening 12, so that the dial and hands of the time piece will be visible through the plate to one looking into the mirror.

A cup shaped shell or casing 20 is disposed over the time piece, and its side wall is provided with a notch 21, which fits over or receives the winding and setting stem 22, of the time piece. The shell fits snugly over the ring 14 and is frictionally confined thereon, the notch 21 enabling the side wall of the casing at its open edge to be sprung outwardly slightly in order to fit and grip resiliently the periphery of the projecting end of the ring 14. The shell 20 thus confines the time piece to the plate, and a resilient pad 23, such as of felt or sponge rubber, may be disposed between the rear face of the time piece and the bottom or back wall of the shell or casing 20, so that the time piece will be held yieldingly against the plate, and its vibration prevented. The stem 22 of the time piece preferably extends slightly beyond the edge of the plate, as shown in Fig. 1, so as to be easily accessible for winding and setting of the time piece.

The embodiment of the invention shown in Fig. 5 is similar to that of Figs. 1 to 4, except that the shell 20a, instead of being frictionally confined on the ring 14a, is positively secured thereto by mechanical means, such as by screws 24 which pass through the side wall of the shell and are threaded into the ring 14a.

The embodiment of the invention shown in Fig. 6 is similar to that shown in Fig. 5, except that the ring 14a is shouldered or offset outwardly as it leaves the groove in the plate 10, so as to provide a shoulder fitting against the rear face of the plate.

In the embodiment of the invention shown in Fig. 7, the movement 25 of the time piece is without its usual casing and abuts against a shoulder 26 in a shell or frame 27. The frame 27 fits against the rear face of the plate 10 and is provided with an annular flange 28 which extends into the groove 13 in the rear face of the plate 10, and is anchored therein, such as by cement, in the same manner as explained in connection with Figs. 1 to 6.

The frame 27 may also have an inwardly extending frustoconical flange 29, surrounding the flange 28, which extends into close proximity to, or into contact with the dial plate of the movement. A ring 30 is fitted against the inner periphery of the frame 27, and may be inserted or removed through the open rear face thereof. The ring 30, when applied to the frame 27, abuts against a rearwardly facing shoulder 31 on the movement 25, so as to confine the movement against the shoulder 26.

The ring 30 is locked releasably in position in any suitable manner, such as by a resilient, split wire ring 32, which abuts against the rear end edge of the ring and is sprung into an annular groove 33 in the inner periphery of the side wall of the frame 27. The open back or face of the frame 27 is closed by a cover or plate 34, which is snapped over the rear end edge of the frame 27, in the manner usual in watch cases.

The movement 25 may be removed for inspection, repairs or replacement, by first removing the cover or plate 34 and then spring the split wire spring 32 out of the groove 33, which releases the ring 30 and through it releases the movement. The frame 27 remains attached to the plate 10 in the same manner that the ring 14 remains attached to the plate in Figs. 1 to 5.

In the embodiment of the invention shown in Figs. 8 and 9 the time piece 19 corresponds with the time piece shown in Figs. 1 to 6, and is confined in position at the rear face of the plate by a cup-shaped casing or shell 35, which fits over the time piece with its open end or face abutting against the rear face of the plate 10. The casing 35 is somewhat similar to the casing 20 of Figs. 1 to 4, and its side wall is provided with a notch 36 which fits over or receives the stem 22 of the time piece. The open end or edge of the casing 35 extends directly into the groove 13 in the rear face of the plate 10, and is sprung into tight clamping engagement with a side wall of the groove 13 in order to secure the casing directly to the plate.

For this purpose the casing 35 may be provided with ears or lugs 37 on opposite sides of the notch 36, and closely adjacent the rear face of the plate 10 when the open edge of the casing 35 is received in the groove 13. A bolt 38 is passed between and through the ears or lugs 37, so that when the bolt is tightened, it will contract the open end of the casing into firm clamping engagement with a wall of the groove 13, and lock the casing removably to the plate 10. The pads of cushions 23, of Figs. 1 to 3 may also be used in this embodiment of the invention, between the end wall of the casing and the time piece.

The embodiment of the invention shown in Fig. 10 is similar to that shown and described in connection with Figs. 8 and 9, except that the casing 35a is provided at its open edge with a slight internal bead or flange 39 which engages in an under cut portion of the groove 13a when the casing is contracted at its open edge. This provides for a positive mechanical interlock between the open end of the casing 35a and the plate 10.

In the embodiment of the invention shown in Figs. 11 and 12, the casing 35b, which corresponds to the casing 35 of Figs. 8 and 9, instead of being contracted at its open edge by the lugs 37 and bolt 38, is surrounded by a split band or contractable ring 40, the ends of which are coupled by a bolt 41. The band 40 is disposed closely adjacent the rear face of the plate 10, and when contracted by the tightening of the bolt 41, it will forcibly contract the open end of the casing into clamping engagement with a side wall of the groove 13, the same as explained in connection with Figs. 8 and 9.

In the embodiment of the invention illustrated in Figs. 13 and 14, the time piece 19 is confined to the plate 10 by a split ring 42, the ends of which are provided with ears or lugs 43, connected or coupled by a bolt 44.

The split in the ring is located adjacent the stem 22 of the time piece, so as to provide a slot through which the stem of the time piece extends. The ring 42 extends edgewise into the groove 13 of the plate 10, as shown in Fig. 14, and its other end edge is flanged inwardly as at 45, to engage the rear face of the time piece 19 and confine it to the rear face of the plate 10. An annular cushion 46 may be interposed between the flange 45 and the time piece, in place of the cushion 23 in Figs. 1 to 3. By tightening the bolt 44 the ring 42 may be contracted into clamping engagement with a side wall of the groove 13 and thus removably clamped to the plate 10.

In the embodiment of the invention shown in Fig. 15, the movement 25 may be confined in the frame 27 in the same manner as explained in connection with Fig. 7, but the flange 28 at the forward end of the shell 27, instead of being cemented in the groove 13 as in Fig. 7, is provided with helical threads upon its periphery, and this threaded flange is received in an opening 47 in the plate 10a. The flange 28 is smaller in diameter than the opening 47, and the space between the flange and the wall of the opening is filled with cement 48.

The crystal 49 for the movement is mounted in a small bezel or ring 50, which is threaded to the inner periphery of the flange 28, and abuts against the outer end of that flange. The periphery of the bezel 50 is threaded to form a continuation of the threads of the flange 28, so that after the cement has hardened the frame 27 may be unscrewed from the opening in the annular cement ring 48 and replaced when desired.

It will be noted that the grooves 13 and 13a and the opening 47 may be considered, in effect, to be chambers formed in the interior area of the plate and opening through the rear face of the plate so as to provide a side wall of the chamber which is approximately normal to the rear face of the plate, to which side wall the confining member for the time piece may be anchored.

It will also be observed that in all the embodiments of the invention, the time piece is removably confined to the rear face of the plate in a position to be visible easily through the sight opening or clear area 12. Such a combined mirror and time piece may be easily wiped or cleaned and will be particularly attractive in appearance, because of the absence of fingers fitted over the edges of the plate and heretofore used for securing the time piece to the plate. The depth of the time piece and its securing means will also be a minimum.

In the embodiments of the invention shown in Figs. 1 to 14, the usual crystal of the time piece is unnecessary and its place is taken by the transparent area of the plate 10 which forms the sight opening or area. The time piece may be easily removed or replaced when desired, and the means by which it is confined to the plate or mirror is exceedingly simple, compact, practical and inexpensive.

It will be understood that various changes in the details, which have been herein described and illustrated for the purpose of explaining the nature of the invention, may be made by those skilled in the art within the principle and scope of the invention, as expressed in the appended claims.

I claim:

1. Improved means for mounting a dial instrument comprising a transparent member having upon a part of its rear face an internal chamber opening through said rear face and closed by the other face thereof, a dial instrument disposed at the rear face of said member at the rear of the closed end of said chamber and visible through a portion of said member, and a member engaging said instrument and cemented in said chamber to confine said time piece to said member.

2. Improved means for mounting a dial instrument comprising a transparent member having upon a part of its rear face an internal chamber opening through said rear face and closed by the front face of said member, a dial instrument disposed at the rear face of said member and visible through a portion of said member, and means cemented within said chamber and formed of separable sections for receiving and supporting said instrument, one of said sections being free of said member when separated from the other section to permit insertion or removal of said instrument.

3. Improved means for mounting a dial instrument comprising a glass plate, a dial instrument disposed at the rear of said plate with its dial visible through said plate, and metallic means telescoping with a portion of said plate in an interior area of a face of said plate, and cemented to said plate and mounting said instrument.

4. Improved means for mounting a dial instrument comprising a glass plate having a groove in a face surface thereof, a dial instrument disposed at the grooved surface of said plate in a position in which it is visible through said surface, and a case formed of separable sections removably mounting said instrument, one of said case sections being anchored to said plate within said groove.

5. Improved means for mounting a dial instrument comprising a glass plate having a groove in one surface thereof, a dial instrument disposed at the grooved surface of said plate in a position in which it is visible through said surface, and a case formed of separable sections removably mounting said instrument, one of said case sections being cemented within said groove.

6. Improved means for mounting a dial instrument comprising a transparent plate having a groove in the rear face thereof, an anchorage member cemented in said groove and extending from the rear face thereof, a dial instrument fitted against the rear face of said plate, so as to be visible through said plate, and means detachably connected to said member and engaging with said instrument to confine the latter to said plate.

7. Improved means for mounting a dial instrument comprising a transparent plate having a groove in the rear face thereof, an anchorage member in said groove, and having an outwardly facing shoulder in a side wall facing a side wall of said groove, a mass of cement filling said groove and covering said shoulder to prevent withdrawal of said member, a dial instrument disposed against the rear face of said plate in a position to be visible therethrough, and means attached to said member and confining said instrument to said plate.

8. Improved means for mounting a dial instrument comprising an imperforate, one piece homogeneous transparent member of uniform thickness across its face having a cavity in one portion of a face thereof and of a maximum depth less than the thickness of said member, a dial instrument and means engaging said instrument and extending into said cavity, and directly anchored therein, whereby said instrument will be supported from said member completely by its anchorage within said cavity.

9. Improved means for mounting a dial instrument comprising an imperforate, one piece homogeneous transparent member of uniform thickness across its face having a cavity in one portion of a face thereof and of a maximum depth less than the thickness of said member, a dial instrument and means engaging said instrument and extending into said cavity, and anchored within said cavity directly to the wall thereof, whereby said instrument will be supported from said member solely by its anchorage within said cavity.

10. Means for securing a dial instrument to a face of a panel which comprises a groove in said panel face, an anchorage member disposed against said face and having a section cemented in said groove, a casing removably attached to said member, and an instrument removably mounted in said casing and confined thereby against said face.

11. Means for securing a dial instrument to a panel, comprising an annular groove in a face of said panel, an annular anchorage member disposed against the grooved face of the panel and having a ring loosely entering said groove, said ring having an internal flange within the groove and spaced from the open face of the groove, cement filling said groove and anchoring said ring therein, a dial instrument, and means for removably attaching said instrument to said member.

12. Means for attaching an instrument to a plate comprising an annular groove in the rear face of the plate and of a maximum depth less than the thickness of said plate, a cylindrical shell having an end portion in said groove and cemented therein, with the shell projecting from the rear face of the plate, means removably engageable with the rear end of said shell and forming with said shell and said plate a substantially complete enclosure whereby said instrument can be mounted in said enclosure and removed therefrom upon removal of said means which engages the shell.

13. Improved means for mounting a dial instrument comprising a panel member, a securing member telescoping partially with a portion of said panel in an interior face area thereof, cement between the telescoping portions of said panel and member for securing them together, and a dial instrument supported by said member and covered by a portion of said panel.

14. Means for mounting an instrument casing behind a glass panel comprising a glass panel having a groove U-shaped in cross section in the rear thereof; a metal ring having a flaring extension smaller in cross section than the cross section of the U-shaped groove and adapted to fit loosely therein, said extension being fixed in said U-shaped groove solely by cement; and screw means for securing said casing in position, whereby the face of an instrument in said casing may be seen through the glass panel.

15. Improved means for mounting a dial instrument comprising a glass plate having a groove in one surface thereof, a dial instrument disposed at the rear of said plate in a position in which it is visible through said surface, means confining said instrument to said plate, and means in said groove for anchoring said confining means to said groove.

WILLIAM LA HODNY.